(12) United States Patent
Jayanthi

(10) Patent No.: US 8,588,814 B2
(45) Date of Patent: Nov. 19, 2013

(54) CLIENT IN MOBILE DEVICE FOR SENDING AND RECEIVING NAVIGATIONAL COORDINATES AND NOTIFICATIONS

(76) Inventor: Madhavi Jayanthi, Laguna Niguel, CA (US)

( * ) Notice: Subject to any disclaimer, the term of this patent is extended or adjusted under 35 U.S.C. 154(b) by 782 days.

(21) Appl. No.: 12/012,859

(22) Filed: Feb. 5, 2008

(65) Prior Publication Data
US 2009/0197617 A1    Aug. 6, 2009

(51) Int. Cl.
*H04W 64/00* (2009.01)

(52) U.S. Cl.
USPC ............ 455/456.2; 455/456.1; 342/450; 342/465; 340/988; 340/996

(58) Field of Classification Search
USPC ............................................. 455/456.2, 459
See application file for complete search history.

(56) References Cited

U.S. PATENT DOCUMENTS

| | | | |
|---|---|---|---|
| 5,031,104 A * | 7/1991 | Ikeda et al. | 701/209 |
| 5,628,050 A * | 5/1997 | McGraw et al. | 455/12.1 |
| 6,091,956 A * | 7/2000 | Hollenberg | 455/456.5 |
| 6,321,158 B1 * | 11/2001 | DeLorme et al. | 701/201 |
| 6,895,238 B2 * | 5/2005 | Newell et al. | 455/414.2 |
| 2002/0142759 A1 * | 10/2002 | Newell et al. | 455/414 |
| 2007/0270159 A1 * | 11/2007 | Lohtia et al. | 455/456.1 |
| 2008/0171555 A1 * | 7/2008 | Oh et al. | 455/456.1 |
| 2010/0029302 A1 * | 2/2010 | Lee et al. | 455/456.6 |

* cited by examiner

*Primary Examiner* — Lester Kincaid
*Assistant Examiner* — Diego Herrera

(57) ABSTRACT

A first mobile device requests a second mobile device to navigate to a destination communicated to the second mobile device by the first mobile device, wherein at least the second mobile device, if not both the first and the second mobile devices, is GPS enabled and is capable of navigation. In one scenario, a first user of the first mobile device requests the second device (or the user of the second device) to send a notification when the second user has reached a certain destination or is in the vicinity of a certain location where the first user and the first mobile device are currently located.

20 Claims, 4 Drawing Sheets

CLIENT IN MOBILE DEVICE FOR SENDING AND RECEIVING NAVIGATIONAL COORDINATES AND NOTIFICATIONS

CROSS REFERENCES TO RELATED APPLICATIONS

Background

1. Technical Field

The present invention relates generally to a mobile device and particularly to a solution wherein notifications are sent from one mobile device to another to inform a user that another user has arrived.

2. Related Art

Mobile devices are becoming ubiquitous. Children carry them and so do adults. Children use them to ask their parents to come pick them up at a mall or a park. Often parents spend a lot of time trying to locate their child at a mall when they get a call for a ride. Similarly, children wait for a long time outside a mall waiting for their parents to arrive, often in inclement weather. This problem is also faced by mobile users who travel to a new country on business and pleasure and wait for a taxi pickup at an airport, outside an airport or in train stations.

Quite often, a first user and a second user have both GPS enabled devices but one of them cannot easily inform the other user where he/she is currently located or provide directions to the second user that will help the second user meet the first user. When the first user wants the second user to call him/inform him when the second user gets to a specific place in order to provide the first user some time to get ready to meet with him, often the second user is incapable of calling the first user on the phone, especially if he is driving a vehicle. For example, if the second user is expected to call the first user (on a mobile phone) when the first user gets close to a mall, so that the first user, presumably closer to the mall than the second user, can then join the second user at the mall, the second user is incapable or unable to make the call for several reasons, thereby causing confusion and inconvenience to the first user. Similarly, if a first user may want to know if the second user has reached a destination safely and on time, the second user is often incapable or unable to make the call for several reasons, thereby causing confusion and inconvenience to the first user.

If a person wants a ride (in a car, motorcycle etc.) from a friend, the person often has to wait, some times outdoors in inclement weather, to determine if his ride has arrived and to be able to hook up with his friend. Often, the person waiting has no idea when his friend will show up, especially if his friend is held up by traffic. Although his friend could call him on his mobile phone to keep him posted, it requires the ability to operate the mobile phone while driving, which is illegal in quite a few places in the world.

GPS satellites have been used for a while for navigation. GPS satellites do not actually pinpoint your location as is commonly believed. The 24 satellites circling the earth each contain a precise clock that transmits a signal comprising a time to the GPS receiver in a user's mobile device. The mobile device processes the satellite signals to determine geometrically where the user is located. The signals travel at a known speed—the speed of light through outer space, and slightly slower through the atmosphere. The mobile device (or more precisely, a GPS receiver circuitry in the mobile device) uses the arrival time to compute the distance to each satellite, from which it determines the position of the mobile device using geometry and trigonometry. The location of the mobile device is expressed in a specific coordinate system, e.g. latitude/longitude, using the WGS 84 geodetic datum or a local system specific to a country.

When a user makes a request for directions, the signal goes from the user's mobile device/handset through a cell phone tower to a service provider's servers, such as (for example) the TeleNav servers. TeleNav immediately pulls up the relevant maps, businesses, gas prices, etc. and send this information back through the cell phone towers to the user's mobile device.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention provides an elegant means of interaction between people wherein the location information from a first user's mobile device is communicated to a second user's mobile device. Using the communicated location information, the second user's mobile device guides the second user to the current location of the first user. In addition, when the second user is close to (in proximity within 1 mile, for example) the first user, the second user's mobile device communicates an "almost there" notification, followed by an "arrived" notification to the first user's mobile device.

When a first member of an online social group needs to communicate details of a trip to his friends in the social group, the first member employs a client in the first mobile device to record a trip details comprising a plurality of waypoints with associated audio, video, textual and other related information. Then the first member uploads, employing the client, the trip details to a server accessible by the social group (or a subset thereof). The other members of the social group can download the trip details onto their own corresponding mobile devices and activate it using the client available so as to visit all the landmarks/locations associated with the various waypoints of the trip details.

Also, the present invention expands the mode of interaction between friends who want each others company at a mall or at a landmark, making it possible to communicate their present locations using GPS based information and providing a client capable of guiding the friends to a destination of interest. Furthermore, the present invention facilitates automatic notifications to a waiting friend from another visiting him or joining him, especially with the use of "almost arrived", "arrived" and other advisory/informatory notifications.

Thus, in accordance with the present invention, a user can access new GPS and navigation based services on the server, and browse through trip details uploaded to the server, select one of them, download them to their own mobile devices, and embark upon a similar trip employing guidance provided by a client in their mobile devices capable of processing the trip plan and navigating to the various waypoints, in the order specified or in an user specified order.

Figure 1:
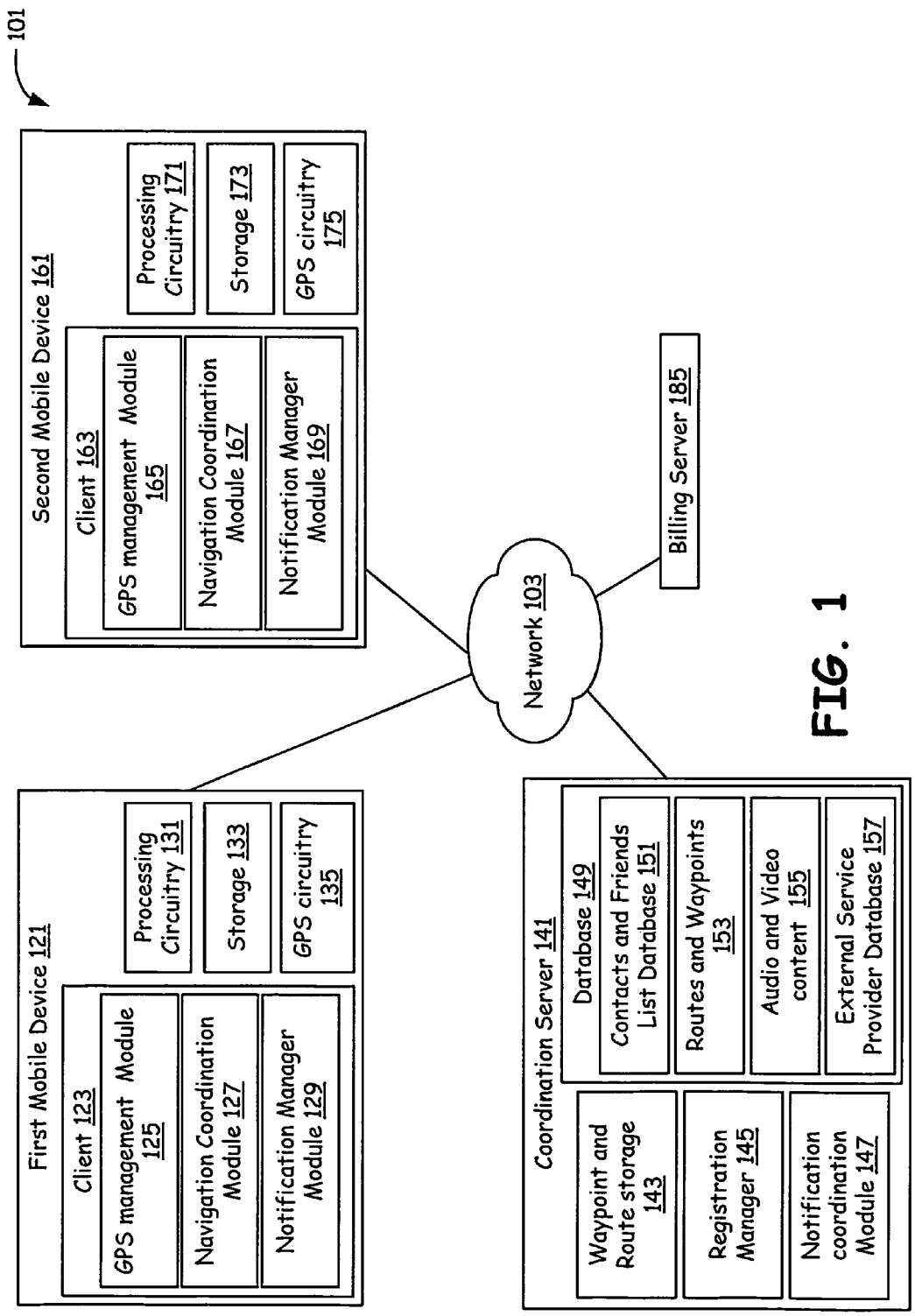
FIG. 1 is a perspective block diagram of a mobile web system wherein a first mobile device with a client facilitates sending a location information to a second mobile device, enabling a client in the second mobile device to guide a second user to a desired location based on the location information received from the first mobile device.

FIG. 1 is a perspective block diagram of a mobile web system 101 wherein a first mobile device 121 with a client 123 facilitates sending a location information to a second mobile device 161, enabling a client 163 in the second mobile device to guide a second user to a desired location based on the location information received from the first mobile device 121. In general, the client 123 and the client 163 comprise similar functionality and are capable of sending/receiving location information (GPS based, navigational data based, etc.) and consuming the location information in guiding an associated user to a desired location/destination. The first and second mobile devices 121, 161 are one of a GPS enabled mobile phone, a navigational device (such as a Garmin, Tom-Tom, etc.), a navigational unit in a vehicle (such as a car, motorcycle etc.), a PDA, a laptop with a navigational circuitry/navigational software, etc.

The first mobile device 121 automatically informs the second mobile device 161 that it has reached a certain destination after it has received location information (which can be specified as GPS coordinates, landmark information, etc.) from the second mobile device 161 and has guided a user of the first mobile device 121 to that destination. For example, the first mobile device 121 automatically sends a notification with a message comprising the text "Arrived" when it reaches a destination employing the received location information. The first mobile device 121 also automatically sends a notification with a message comprising the text "Almost There" (or some similar message or graphics) when it is a mile or so, or a minute away from the destination.

The first mobile device 121 comprises the client 123, a processing circuitry 131, a storage 133 and a GPS/navigational circuitry 135. The client 123 comprises a GPS management module 125, a navigational coordination module 127, and a notification manager module 129. The a GPS management module 125 interacts with the GPS/navigational circuitry 135, retrieving GPS coordinates, setting GPS coordinates for a destination to which the user wants to go, interacting with the navigational coordination module 127, etc. The coordination module 127 facilitates setting landmark information where a user desires to go, guiding a user to reach a destination, following a route (according to a trip plan) to reach a destination, retrieving and displaying a computed route, distance and estimated arrival time for reaching a destination, etc. The notification manager module 129 facilitates receiving notification from other mobile devices and displaying them, sending notifications to other mobile devices informing them of a proximity information, approaching information, arrival information, billing information, etc. The second mobile device 161 also comprises modules and circuitry similar to those in functionality that are described here for the first mobile device 121.

The coordination server 141 makes it possible for the first mobile device 121 to interact with one or more other mobile devices, such as the second mobile device 163. It facilitates communication of notifications, GPS coordinates, navigational information such as trip plans, routes, landmarks, distances, approaching and arrival information, etc. It also facilitates billing for trip plans shared with others, trip plans purchased, services accesses such as notification to a waiting user of a first mobile device who needs to know if his ride has arrived, etc.

The coordination server 141 comprises a waypoint and route storage 143, a registration manager 145, a notification coordination module 147, and a database 149. The waypoint and route storage 143 stores and retrieves uploaded trip plans, routes, waypoints, bookmarks, etc. A user can upload them for sharing, and optionally bill others for downloading or using them. The registration manager 145 facilitates user registration and service access, wherein user registration comprises creating an account, optionally setting up a billing account, establishing a login and password, and enabling security services. The registration manager 145 make sit possible for users to register the details of their mobile devices such as one or more of a phone number, an IP address, a device serial number such as ESN or IMEI, MSISDN, a subscriber information, etc. It also facilitates registration of phone numbers and other details of friends and family with whom a user's mobile device is likely to share navigational information, receive notifications and requests for navigation data sharing, etc. The notification coordination module 147 facilitates sending notifications and receiving notifications.

The database 149 comprises a contacts and friends list database 151 that makes it possible to specify (and control) who gets to participate in interactions with a registered user, by default. It also comprises a routes and waypoints database 153 that is used to store, retrieve and manage waypoints, trip plans and routes uploaded for sharing by users, those that are made available for sale by businesses, etc. The database 149 also comprises an audio and video content database 155 that is sued to store, retrieve and manage audio, video, graphic and textual content that a user would enter as user specified data (recorded by the user for example) for a trip plan or waypoint saved and/or shared by the user.

In one scenario, a first user of the first mobile device 121 requests the second device 161 (or the user of the second device) to send a notification when the second user has reached a certain destination or is in the vicinity of a certain location where the first user and the first mobile device 121 are currently located. The client 163 in the second device 161 alerts the second user of the second device 161 prompting him to accept such a request. The second user interacts with the client 163 in the second device 161 (which can be a GPS enabled mobile phone) and accepts a geographical information, a landmark name, or a reference to the destination of interest. The client 163 stores it and monitors the location changes of the second mobile device 161. When the second mobile device 161 detects that it is "near" or "approaching" the destination of interest, it automatically, without any second user intervention, creates a message and sends it as a notification to the first mobile device 121. The client 121 in the first mobile device 121 receives the notification and selectively presents/displays the message, or an alternative information, to the user of the first mobile device 121. The client 123 in the first mobile device 121 also facilitates communication of a follow message from the first user of the first mobile device 121 to the user of the second mobile device 161. For example, the followup message can be "Be out in 3 minutes", or "Park in the rear". The followup message can be a canned message selected by the user from a list, an adhoc message entered from a keyboard, or an audio message input by the first user using the client 123. The use of graphics for the same purpose is also contemplated.

The client 123 in the first mobile device 121 makes it possible for a user to enter/associate a second mobile device 161 as an interested party, employing a device identification, a user identification, a service related identification, etc. The client 123 in the first mobile device 121 then communicates with the client 163 in the second mobile device 161 passing parameters as necessary, in order to provide sufficient information to the second mobile device 161 that will enable it to participate in a service (such as a arrival notification service). For example, the client 123 in the first mobile device 121 then communicates a GPS coordinate associated with its current location or a landmark information to the client 163 in the second mobile device 161.

The present invention makes it possible to record a complete "trip album" by the client 123 as the user of the first mobile device 121 travels on a trip and records one or more waypoints along one or more routes, takes pictures at those waypoints/landmarks, record audio and video inputs and stores it as a shareable album on the coordination server 141. The second mobile device 161 is then sent a link to the trip album (employing a reference such as a URL or identification) and the client 163 makes it possible to not only view the trip album (play audio, view pictures and video for example) but also activate the trip (i.e. guide the user through the various waypoints/landmarks along the routes of the trip) and create the user's own trip album, that can also be uploaded and shared at the coordination server 141. In a related embodiment, the users who download trip albums created and uploaded by another user get billed by the billing server 185, with the collected proceeds being shared with the another user who creates and shares the trip album.

The first 121 and the second 161 mobile devices both comprise a client 123, 163 that is capable of receiving GPS related information from the other and processing it. They are also capable of receiving a notification and displaying it to a user. In one embodiment, the first mobile device 121 requests the second mobile device 161 (that is, for example, a GPS enabled vehicle such as an automobile), to send it a notification when the second mobile device 161 is approaching a specific geographical location, such as a landmark or a department store or a specific address. The second mobile device 161 then monitors its own location vis-à-vis the specific geographical location provided by the first mobile device 121. When it determines that it has reached (within a required distance) the specific geographical location, it communicates a notification to the first mobile device 121. The user of the first mobile device 121 can send a response to the notification received that is communicated back to the user of the second mobile device 161. The response can be in textual form, in graphic form or in audio form. For example, the user of the first mobile device 121 may be a child waiting at a library for his parent, the user of the second mobile device 161, to pick him up; the notification sent by the second mobile device 161 can be a textual message indicating that the second mobile device 161 has arrived at the destination; and, the response sent by the user of the first mobile device 121 is an audio response wherein the user says "will be out in 5 minutes".

In one embodiment, the first mobile device 121 requests the second mobile device 161, (wherein, for example, the second mobile device 161 is a GPS based navigation capable vehicle such as an automobile), to send it a notification when the second mobile device 161 is approaching and within a certain minimum distance, such as a ¼ mile. The second mobile device 161 then receives periodic update information from the client in the first mobile device while it also receives GPS information (from a set of satellites, for example) and computes its own location and its current distance from the first mobile device 121. When it determines that it is within the required distance away from the first mobile device 121, it sends the first mobile device 121 a notification informing it of related information, such as an estimated time when it will reach a destination specified (referenced by) by the first mobile device 121. In a related embodiment, the first mobile device 121 also receives periodic updates of its current location from the second mobile device 161.

In one embodiment, the user of a first mobile device 121 desires the presence/company of a user of a second mobile device 161. The user interacts with the client 123 in the first mobile device 121 to communicate its current location to the client 163 in the second mobile device 161, in order to facilitate travel by the user of the second mobile device 161 to a location close to that of the user of the first mobile device 121. The client 163 in the second mobile device 161 receives the GPS coordinates (or a landmark information, etc.) from the client 123 of the first mobile device 121, and stores it. It then enables/activates a navigation feature in the second mobile device 161 to guide the user to the desired GPS coordinates. When the user of the second mobile device 161 has reached the specified destination, the client 163 in the second mobile device 161 sends a notification to the client 123 of the first mobile device 121. Such notification can be sent automatically, or as an user initiated communication, based on configuration or user preference.

In one embodiment, a GPS client 123 or a GPS based Navigation client 123 in a first mobile phone 121 or a first mobile device 121 sends a notification to a second user, such as employing a SMS message, to another user who is using a mobile phone 161, which may not have the client 163. The first mobile phone 121 is configured to send the notification to one of an email address, an Instant Messaging client in another device, and to a mobile phone. The notification is sent when the user of the first mobile phone 121 (that comprises a GPS support) is determined to be in proximity (for example, at a certain distance) of a preset location (such as a town/city/a shopping mall, a public place such as a coffee shop or a department store, etc.). The notification is received by the second user via email, via an instant messaging client (on a PC or mobile phone) or via an SMS message, etc. on the second mobile device 161.

The present invention also makes it possible for a first mobile device 121 to receive notifications from a plurality of second mobile devices 161, wherein the plurality of second devices are configured to send a notification to the first mobile device 121 when they arrive at a preset/configured geographical location at an expected/anticipated time duration. The notifications are sent by each of the plurality of second mobile devices 161 after an optional authentication (such as employing passwords or tokens) of the associated users. In a related embodiment, the first mobile device 121 takes an "attendance" employing notifications received from the plurality of second mobile devices 161. In yet another related embodiment, the authenticated attendance detected for each of the plurality of second mobile devices 161 results in a selective charging of the corresponding user for a service granted/provided.

When the second mobile device determines that is has reached (monitoring is one way to determine this) the specified GPS coordinates or landmark, it then communicates an "arrived" notification to the client in the first mobile device, which displays an appropriate message, jingle, graphic or information to the user.

In one embodiment, the user of a GPS enabled first mobile device 121 bookmarks one or more location/GPS coordinates (such as during a trip) and subsequently communicates those bookmarks to another user who is using a second GPS enabled mobile device 161. The second user then activates the client 163 to employ those bookmarks to guide the user to those designated places/landmarks, as and when desired. In a related embodiment, the client 163 facilitates visiting a sequence of landmarks/GPS coordinates in a specific order using the bookmarks, wherein the order is specified by the user of a GPS enabled first mobile device 121, or by the user of a GPS enabled second mobile device 161 or is some other order specified by a third party of a server.

In one embodiment, the user of a GPS enabled first mobile device 121 bookmarks one or more location/GPS coordinates (such as during a trip) and subsequently communicates those bookmarks to another user who is using a second GPS enabled mobile device 161. The second user then activates the client 163 to employ those bookmarks to guide the user to those designated places/landmarks, as and when desired. In a related embodiment, the user of a GPS enabled first mobile device 121 bookmarks one or more landmark locations into a trip plan with corresponding GPS coordinates for an entire trip (that may have taken several days and across several countries) and subsequently communicates those bookmarks to a coordination server 141 where it is stored and made available to other users, who can then download it into their own mobile devices or into other navigational devices, and then use them in their own trips. For example, a new user can download the trip plan onto a second GPS enabled mobile device 161 and follow the trip plan to visit all the places (such as by driving in a car with the second GPS enabled mobile device, which could be a navigational device), in the order prescribed by the trip plan or in an alternate order.

In a related embodiment, the client in the first mobile device 121 that bookmarks one or more location/GPS coordinates (such as during a trip) also facilitates audio, video, and textual input by a first user for each of the bookmarked locations. When the bookmarks are loaded into the coordination server 141, such audio, video, and textual input by the first user for each of the locations is stored, and subsequently shared with other users who may download the trip plan onto their own mobile devices, such as a second GPS enabled mobile device 161. A corresponding client 163 in the second GPS enabled mobile device 161 facilitates playback/review of the audio, video, and textual input by the first user.

In one embodiment, a coordination server 141 capable of interacting with a plurality of GPS enabled mobile devices 121, 161 facilitates dynamic and location detecting based ticket sales. For example, the coordination server 141 when deployed at a concert or an open air movie theatre sends an invitation, with GPS coordinates of a amphitheatre, cinema house or a landmark, and with a corresponding passcode to a plurality of GPS enabled mobile devices 121, 161. The recipients use the GPS coordinates, landmark information, etc. to arrive at that location, with the help of the client software in the mobile devices 123, 163 or a navigational software. When they arrive at the desired location/destination, the coordination server 141 is sent an arrival notification, in response to which the coordination server 141 sends them a challenge requesting the entry of a passcode (for example, and other forms of user authentication are also contemplated, such as the use of user associated certificates, etc.). The user enters the passcode, gets authenticated, and the coordination server 141 then interacts with a billing module or a billing server 185 to optionally bill the user for a concert or an activity that the user is able to witness or participate in. The user's mobile device 121, 161 is also sent a billing confirmation information. To aid non-repudiation, for example, the second mobile device 161 (or a client 163 associated with it) sends its GPS coordinates (after arriving at the destination) to the coordination server 141 along with the arrival notification. In a related embodiment, it also digitally signs the GPS coordinates that is sent to the coordination server 141, employing, for example, keys previously provisioned into the mobile device, that can be used for non-repudiation purposes.

The client 123 and the client 163 are embedded client software in one embodiment and are downloadable client software in another. In a different embodiment, the client 123, 163 comprise a navigational software that is capable of guiding a user to a desired destination or to a desired point on a map or to a landmark based on GPS circuitry and associated maps.

The users of the GPS enabled mobile devices 121, 161 each employ a corresponding client software (in their mobile devices) 123, 163 in one related embodiment, that receives invitations, guides a user to drive a vehicle (or otherwise guides him to the location desired), sends a notification of arrival, receives an optional challenge, and lets the user provide the passcode in response, and subsequently receives a billing notification. The client software 123, 163 is configured to interact with the coordination server 141, and receives GPS coordinates, landmark information etc. from the coordination server 141, communicates arrival notifications, user responses to passcode challenges, etc. In a related embodiment, the client software 123, 163 is also configured to communicate a subscription information or a device identification (or some other identification, such as an email address) to the coordination server 141 to facilitate billing (and for other reasons, such as retrieval of a profile, etc.)

The present invention provides a client in the mobile devices that employs a generic interface for retrieving positioning information and navigation information in the mobile devices. This generic interface works with most positioning methods, such as GPS or E-OTD (Enhanced Observed Time Difference).

The present invention provides for the client 123 in the mobile device 121 saving one or more waypoints as part of a travel plan at the coordination server 141. A waypoint is a position a user wishes to save and return to later. The present invention typically allows a user two methods to store waypoints in memory. A quick save method uses the coordinates from either the mobile device's present position or one selected from a navigational map. In this method, the waypoint is automatically identified with the next available waypoint number or a waypoint name (associated with a landmark identified to be in proximity) in the list. The user directed method lets the user pick a specific waypoint number or name under which the user intends to store the new waypoint. This procedure also allows the user to name the waypoint. When communicating GPS coordinates (or location information in general), the mobile device (employing NMEA 0183 protocol or an alternative) sends altitude/longitude position, steering, speed and other navigational data, as necessary. This is sent to the coordination server 141 or to another mobile device over the network 103, which is a cellular network, a telematics network, the Internet, etc. The present invention makes it possible to build a route using waypoints collected by a user during a trip, such a route (from one address to another or from one landmark to another) being uploaded to the coordination server 141 for sharing with other friends/other individuals who can use them in their own GPS enabled mobile devices (or their navigational systems) for their own trips.

The present invention makes it possible to navigate (a vehicle for example) employing the GPS coordinates (or navigational data) sent to the mobile device 161 (from another mobile device 121 or the coordination server 141). One method involves retrieving a waypoint stored in memory, received in a message from another mobile device 121, or communicated to the mobile device 161 by the coordination server 141. The mobile device 161 then provides instructions to a navigation component (resident in the mobile device 161, for example) to navigate to that waypoint. In general, if the waypoint is retrieved from a message (such as an SMS based message or a proprietary message) received by the client 163 in the mobile device 161, or communicated by some other means to the client 163 (such as over Bluetooth, over instant messaging service, or over email), the waypoint is stored and then navigated to.

The coordination server 141 comprises user entries associated with the corresponding user accounts in the database 149, where details of user accounts are maintained. A registered user from a client computer or the mobile devices 121, 163 provides his/her name, e-mail address, account details, preferences, etc. during a registration process. The database 149 is used to keep track of approved individuals (or a friends lists) for each registered user. If the approved individuals/friends are themselves registered users, then corresponding entries exist in the database 149. For those individual friends who are not yet registered users, the database 149 stores contact information such as one or more of a phone number, a email address, an IP address, a mobile device serial number, etc.

Figure 2:
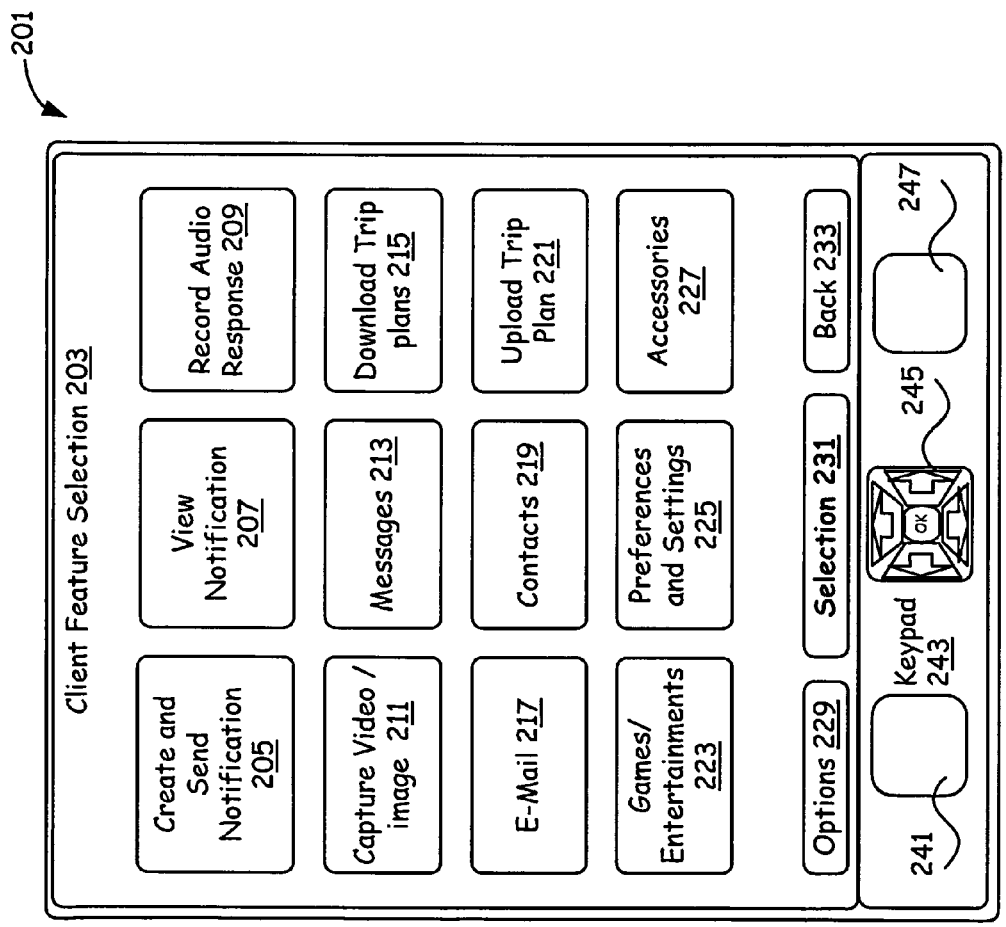
FIG. 2 is an exemplary snapshot of a client feature selection screen of the mobile phone that is present by the client software that is installed and run in the mobile device in accordance with the present invention.

FIG. 2 is an exemplary snapshot of a client feature selection 203 screen of the mobile phone 201 that is present by the client software that is installed and run in the mobile device 201 in accordance with the present invention. The client feature selection 203 comprises the icons list from 205-227 whose selection will accomplish the corresponding functionality. The various features of the client software can be invoked by a user employing the icons presented on this screen. This screen has buttons/icons such as 'Create and Send notification' 205, a 'view notification' 207, a record audio response 209, a capture video/image 211, a messages icon 213, a Download Trips icon 215, an E-mail icon 217, a Contact (book) icon 219, an update trip plan icon 221, a Games/Entertainments icon 223, a Preferences and Settings icon 225, and an Accessories icon 227.

When the user selects the create and send notification button/icon 205 the client software in the mobile device 201 makes it possible for the user to create a new notification from a list of canned notification messages or make a new one. In particular, the client software makes it possible to send the notification to another mobile device. For example, a canned notification comprising the message "About to arrive at destination" is sent to a user of another mobile device to announce the impending arrival at a destination, the location to which had been previously received from the another mobile device.

The view notification icon 207, when activated, invokes screens that facilitate viewing notifications received and notifications sent. In one embodiment, as soon as a notification is received, it is presented to the user in a view notification screen. In addition, a ring, or a jungle is optionally play to bring it to the user's attention. The user can also respond back to the notification, such a response can be provided using audio recording facilities, selecting an appropriate graphic response from a list of pre-created graphics, or by typing text. The record audio response 209 button activates audio functions, such as those that are used to record an audio response, or those used to play audio responses received. In general, a user can choose to provide an audio input to a received notification immediately, or in a deferred/delayed manner, using the record audio response 209 facility.

The capture video/image icon 211 starts video recording, digital photo capture or imaging functionalities. It can also be used to review received video content and play them. The messages icon 213 is used to send messages, for example an SMS message to other mobile phones and client computers. In one embodiment, it is used to send a canned message (pre-recorded) to one or more recipients using the coordination server, wherein the canned message (which may be pre recorded by the user or provided by the service) is either stored and sent from the mobile phone 121 or retrieved from the coordination server 141. In this embodiment, the client 123 is transparently used for sending a message.

The Download trip plans icon 215 supports download of interactive content such as trip plans, from the coordination server, wherein the downloaded content is handled/processed by the client 203 for a service. For example, the trip plans may be tagged with an appropriate MIME type and the client 203 is invoked for content with those MIME types that the client 203 is registered to (and is capable of) handle. In one embodiment, Downloads trip plans 215 provides a shortcut through which a mobile web browser is started and prompts the user to enter a URL of the download site for downloading the trip plan contents.

The e-mail icon 217 starts an e-mail client on the mobile phone prompting the user to login into his e-mail account for sending and receiving e-mails comprising notifications, trip plans, etc. The Contacts icon 219 is the user interface to the 'PIM' (personal information management) available in the mobile device 121, 201, which facilitates managing the contact list available in the mobile device 121. The contacts managed in the PIM comprises individual entries for friends/colleagues, etc. and also names of groups of friends, wherein the membership (individual contact information for the members of the group) details are remotely available at the coordination server 141 (or even at an external service provider website, etc.).

The upload trip plan 221 icon facilitates uploading waypoints, trip plans and associated multi-media content, etc. to the coordination server 141. For example, a user is prompted to upload a trip plan that comprises a plurality of routes, each route comprising one or more waypoints and one more associated audio information, video information, pictures, textual descriptions, etc. In addition, each waypoint may one more associated audio information, video information, pictures, textual descriptions. The trip plan is stored as an XML file and uploaded as an XML in one related embodiment. Other forms of structuring, organizing and storing the related data are also contemplated. The trip plan is uploaded to one or more servers, such as the coordination server 141.

The Games/Entertainments icon 223 opens a list games and entertainment choices currently available/accessible and provides an interface with the entertainment modules for e.g. access to a radio, etc. on the mobile device 201, 121. Users can play games and listen to music, etc. the service provided by third party. The Preferences and Settings icon 225 facilitates an interface for the configuration of the mobile device 201, 121 in terms of its appearance and performance. The accessories icon 227 provides an interface to miscellaneous functionalities such as calculator, calendar, etc.

The client feature selection screen 203 also comprises some soft keys/buttons such as an 'Option' soft key 229, a 'Selection' soft key 231, and a 'Back' 233 soft key. The default action is the 'Selection' 231 button on this screen (i.e. the client feature selection screen) of the highlighted icon when the OK button is hit on the 'joystick' 245 from the keypad 243.

Activating the 241 key from the keypad 243 will open the Options 229 functionality, which results in presenting the user with a list in a menu or sub-menu, which can be browsed using the 'joystick' 245. The 'Back' soft key/button 233 will be selected when the key 247 is activated on the keypad 243, to cancel the current screen to go back to the previous one.

Figure 3:
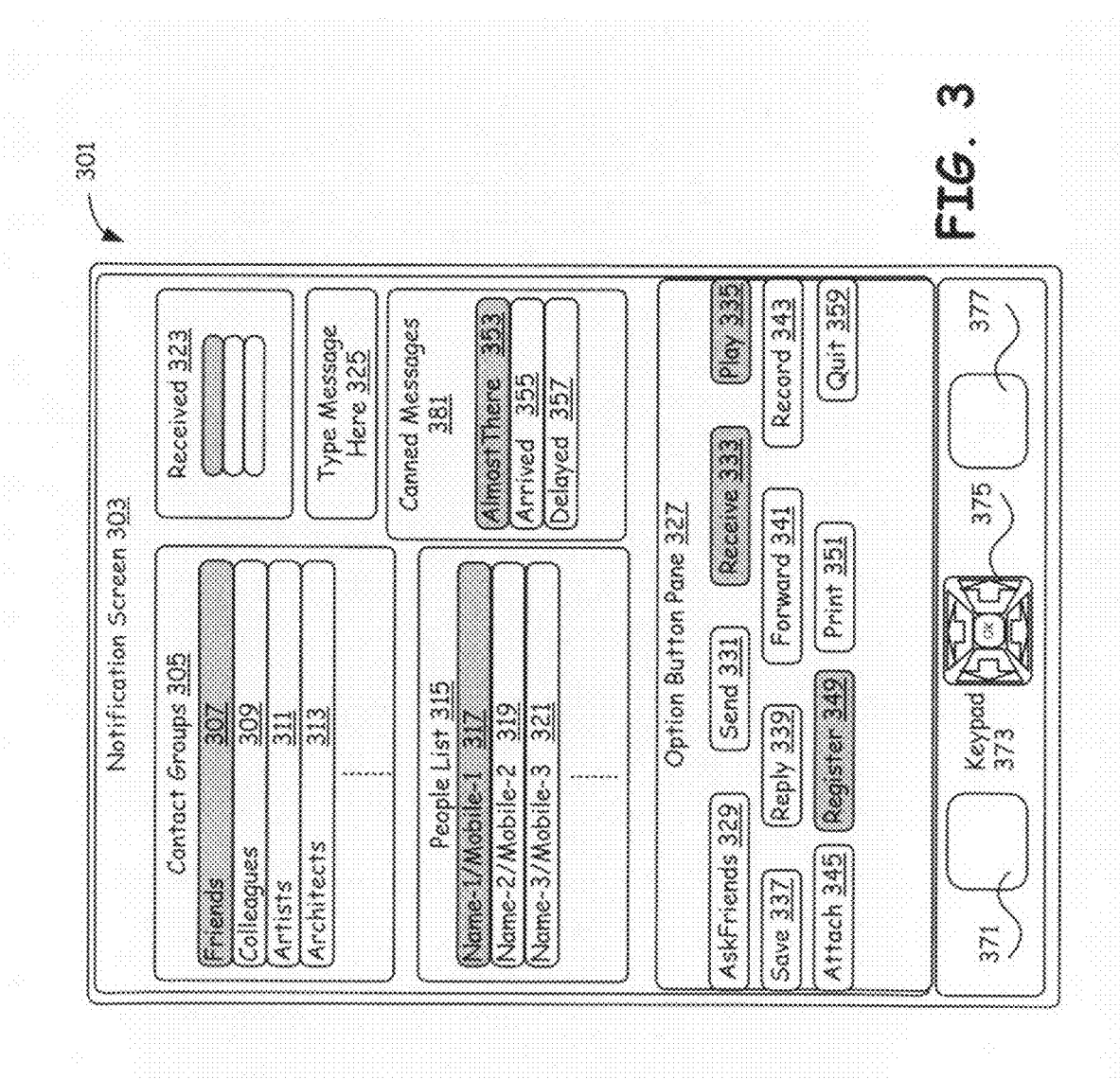
FIG. 3 is an exemplary screen snapshot of a mobile phone depicting the selection of an individual contact from available contact groups for sending a notification, which can comprise at least one of a canned message, a personalized typed message and a graphic selected by the user.

FIG. 3 is an exemplary screen snapshot 301 of a mobile phone 121 depicting the selection of an individual contact from available contact groups for sending a notification, which can comprise at least one of a canned message, a personalized typed message and a graphic selected by the user. Such notifications are sent by a user when the user (and the mobile device) is in proximity to a destination that has been provided by another user/mobile device. For example, the details of the destination may have been provided by another user in the form of GPS coordinates. The user would chose one of the contacts groups displayed in the contacts group list 305, then select (at least) one contact from the corresponding people list 315, such as the entry 317. Then the user would select one of the canned messages, such as "Almost There" 353 and activate the send button 331. In addition, the user can input a textual message in the text input area 325, or provide an audio message employing the record 343 button.

In addition, the notification screen 303 facilitates reviewing notifications received. A received 323 list displays a list of notifications currently available, and when a user selects one of them, the corresponding text is displayed in the text input entry pane 325 (or an alternative). In addition, the sender is highlighted in the people list 315, and a reply can be sent to the sender by activating the reply 339 button. Notifications received can be forwarded to other contacts using a forward 341 button. Pictures, audio portions and video can be attached with notifications sent (using the Send button 331), with replies sent (using the reply 339 button) and with forwarded messages/notifications (using the forward 341 button), such attachments facilitated by features that are made available by activating an attach 345 button.

A 'receive' button 333 is selected by a user to download all the messages and notifications that have been received by a user (into his registered user's account, for example). In one embodiment, the messages comprise of responses received, requests received from other users to which a notification has subsequently been provided, etc. The messages can be sorted by categories or sorted by date/time on the mobile phone 121 of FIG. 1. In one embodiment, the responses received are identified by the recipient's name and mobile phone number pairs. If the recipient does not have a mobile phone number, their account name, email address or associated reference information is displayed along with the name.

The user browses through the list of the notification screen 303 employing the 'joystick' 675. Upon browsing through a list to a particular item, the user selects the one of the appropriate buttons in the option button pane 327. When the user selects a notification received (for example), the latest uploaded photo of the sender appears in an optional 'picture pane' (not shown). This ensures the security and guarantees that the sender is a known person or a friend.

Figure 4:
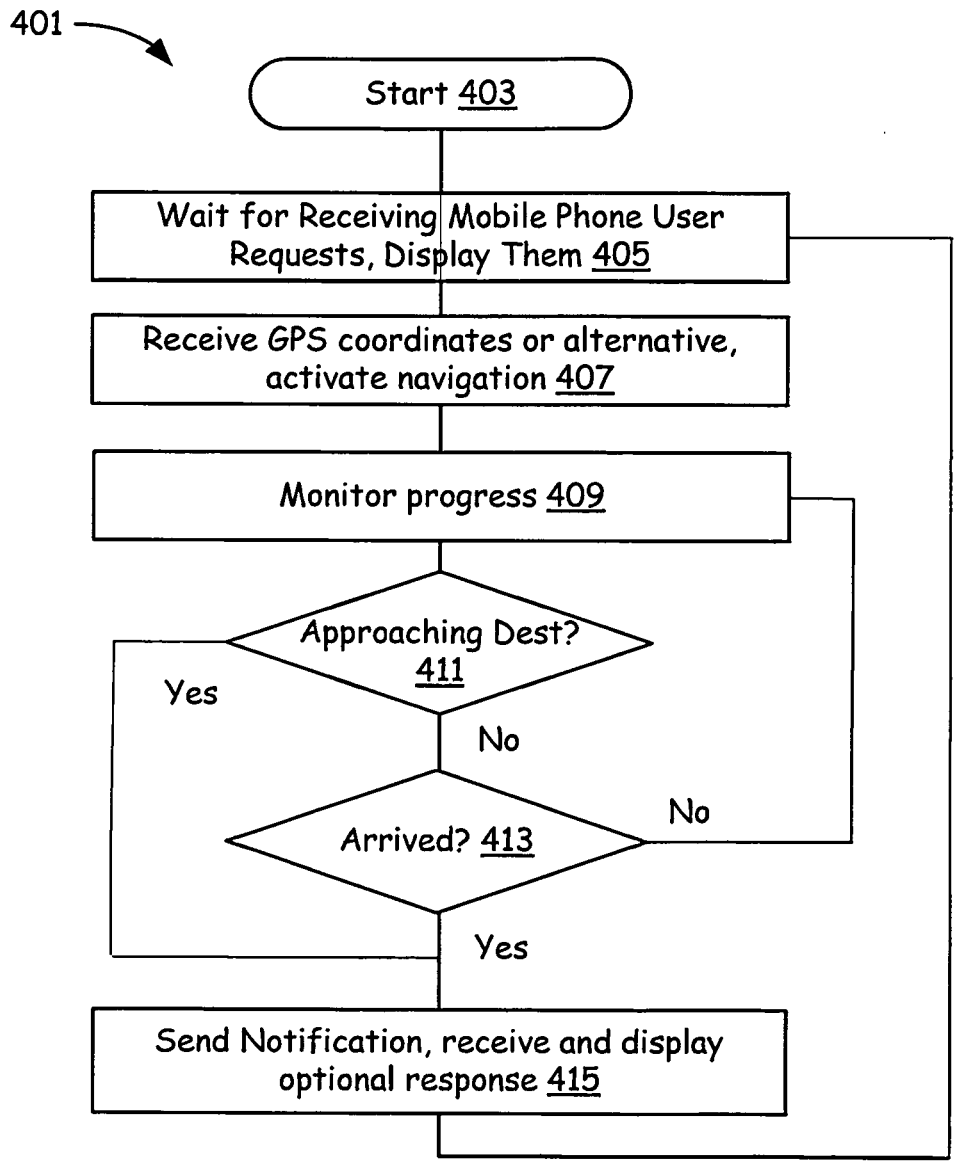
FIG. 4 is a flowchart of an exemplary operation of a first mobile device that is capable of receiving a destination information comprising a navigational data such as GPS coordinates and routes from a second mobile device, the first mobile device capable of guiding a user to the destination specified by a user of the second mobile device.

FIG. 4 is a flowchart of an exemplary operation of a first mobile device that is capable of receiving a destination information comprising a navigational data such as GPS coordinates and routes from a second mobile device, the first mobile device capable of guiding a user to the destination specified by a user of the second mobile device. At a start block 403, the processing starts in the first mobile device. Later, at a next block 405, the first mobile device waits for requests from users of other mobile devices asking the user to navigate to a destination where they are currently located. The request if displayed for review by a user prompting the user to accept the request (and thereby provide consent). In one embodiment, the requests are accompanied by a destination information, such as navigational information. For example, a request from the user of the second mobile device arrives with a destination information provided in the form of a landmark or a GPS coordinates, requesting the user of the first mobile device to navigate (employing the first mobile device) to the destination. The request is displayed to the user of the first mobile device.

Then, at a next block 407, the navigational information, such as GPS coordinates or alternative information (such as a landmark specification), is received, processed and stored. Then, navigation is activated. At a next block 409, the progress towards the destination is monitored. In one embodiment, progress is reported to the second mobile device periodically.

Then, at a next decision block 411, an attempt is made to determine if the user of the first mobile device is approaching the destination. If it is determined that the user is approaching the destination, then, at a next block 415, a notification is sent to the user of the second mobile device, and an optional response sent by the user of the second mobile device is received and displayed. Control then passes to the next block 405 where a next request is anticipated.

If, at the block 411, it is determined that the user is not approaching the destination, then, at a next block 413, an attempt is made to determine if the user of the first mobile device has arrived at the destination. If it is determined that the user has arrived at the destination, then, at a next block 415, a notification is sent to the user of the second mobile device, and an optional response sent by the user of the second mobile device is received and displayed. Otherwise, control then passes to the next block 409 for continued monitoring of progress.

In general, the present invention makes it possible to communicate multimedia contents along with requests for navigation by the recipient to a specified destination, with a reliable server-assisted delivery mechanism for notification between mobile devices as they exchange GPS coordinates and facilitate navigation of one user (of one mobile device) towards the destination specified by another user (of a different mobile device). This provides support for ad-hoc navigation with consent of users. Such transfer of navigational information (routes being communicated, GPS coordinates being exchanged or waypoint information being exchanged) from a mobile phone or from a client computer to another is useful and timely. Similarly the notifications can be sent when a user nears a destination and also while the user of one mobile device navigates towards the destination. This has a lot of applications and addresses a market need.

In addition, the combination of GPS coordinate communication with audio message notifications and subsequent responses is convenient for the users involved, with the use of keyboards minimized if not altogether eliminated.

The present invention discloses a mobile device comprising a global positioning system (GPS) receiver circuitry capable of pinpointing a location and providing directions to a destination. It employs a client software capable of interacting with the GPS receiver circuitry and activating navigation towards the destination. The client software receives a request to navigate to the destination from a second mobile device and accepts the request. It then navigates and provides directions to lead the user to the destination. It also automatically sends notifications to the second mobile device. The present invention also discloses a mobile web system comprising a server communicatively coupled to the first mobile device and the second mobile device. The server facilitates sending navigational coordinates and notifications between the first and second mobile devices. It also facilitates sending notifications from a plurality of mobile devices that congregate at a location, and is able to verify their presence, challenge the users for verification/security, etc. The navigational coordinates are based on at least one of a latitude, longitude, and height system, earth centered Cartesian coordinates, earth centered earth fixed, earth centered inertial, and east north up.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A mobile device comprising:
   global positioning system (GPS) receiver circuitry that, during operation, determines a location of the mobile device;
   client software that, during operation, interacts with the GPS receiver circuitry and activates navigation towards a destination;
   the client software receiving, from a second mobile device, information identifying the location of the second mobile device as the destination and a request to the client software to navigate to the destination;
   the client software accepting the request;
   the client software, responsive to receiving the request, automatically navigating to the second mobile device and providing directions to the destination to the user of the mobile device;
   the client software automatically sending at least one notification to the second mobile device when the client software determines that the mobile device has moved to within a certain distance of the second mobile device while traveling to the location of the second mobile device;
   wherein the mobile device receives a challenge in response to the at least one notification, and in response to the challenge, sends security information and an associated GPS coordinate to the sender of the challenge to enable verification that the mobile device has successfully reached the destination; and
   wherein the security information comprises one or more of a digital signature computed and sent, a passcode entered by a corresponding user, coupon information, and a membership identification.

2. The mobile device of claim 1 wherein the at least one notification comprises one or more of a proximity message, an arrival message, a failure message and/or a deferred message.

3. The mobile device of claim 1 wherein the mobile device and the second mobile device are handheld navigational devices.

4. The mobile device of claim 1 wherein the mobile device and the second mobile device are both GPS enabled cellular phone devices.

5. The mobile device of claim 1 wherein the request to navigate is accompanied by a specification of the destination, wherein the specification employs one of global positioning system (GPS) coordinates, a landmark indicator, and enhanced observed time difference (E-OTD) based location information.

6. The mobile device of claim 1 wherein the at least one notification comprises one or more of a graphic image, a textual message and/or an audio message.

7. The mobile device of claim 1 wherein the at least one notification is provided by the user, and comprises one or more of a textual message input by a user, a canned textual message selected by the user, a graphic selected by a user and/or an audio input recorded by the user.

8. The mobile device of claim 1 further comprising:
the client software receiving and displaying a response provided by the user of the second mobile device as a reply to the at least one notification sent by the client software.

9. A mobile web system, the mobile web system comprising:
a server communicatively coupled to a first mobile device and to a second mobile device;
the first mobile device and the second mobile device comprising client software that, during operation, interacts with the server;
wherein the client software in the first mobile device, during operation, communicates to the server, a request to navigate to a destination and destination information, wherein the destination information identifies a location;
the server communicating the request and the destination information to the second mobile device;
wherein the client software in the second mobile device, during operation, displays the request and receives a consent to navigate to the location from a user of the second mobile device;
wherein the client software in the second mobile device, during operation, responds to the request from the first mobile device by automatically navigating the user to the destination by providing directions guiding the user to the destination using the destination information;
wherein the client software in the second mobile device, during operation, automatically sends at least one notification to the first mobile device when the client software in the second mobile device determines that the second mobile device has traveled to within a certain distance of the destination;
wherein the server challenges the second mobile device when the server receives the at least one notification, and in response, receives security information and an associated GPS coordinate from the second mobile device and verifies that the second mobile device has successfully reached the destination; and
wherein the security information comprises one or more of a digital signature computed and sent, a passcode entered by a corresponding user, coupon information, and a membership identification.

10. The mobile web system of claim 9 wherein the client software in the second mobile device automatically sends a notification to the first mobile device when the second mobile device is approaching the destination, after the second mobile device has arrived at the destination, and selectively periodically during the navigation to the destination.

11. The mobile web system of claim 9 wherein the client software in the first mobile device and the second mobile device facilitates creation of a trip plan comprising a plurality of waypoints and wherein the server facilitates uploading the trip plan for storage and sharing.

12. The mobile web system of claim 11 wherein the trip plan further comprises digital pictures, audio inputs and textual content corresponding to at least one of the plurality of waypoints.

13. The mobile web system of claim 9 wherein the server is communicatively coupled to three or more mobile devices, the mobile web system further comprising:

the three or more mobile devices;
each of the three or more mobile devices receiving the destination information from the server;
each of the three or more mobile devices sending a notification to the server after navigating to the destination based on the destination information; and
the server verifying that each of the three or more mobile devices has successfully reached the destination.

14. A method of communicating between a first mobile device and a second mobile device, the method comprising:
receiving, at the second mobile device from the first mobile device, a request for a notification and navigational coordinates for a destination;
accepting selectively the request from the first mobile device at the second mobile device and storing the navigational coordinates for the destination;
responsive to the request, automatically activating navigation at the second mobile device to the destination employing the navigational coordinates for the destination;
providing at least one notification to the first mobile device by the second mobile device, when the second mobile device determines that the second mobile device has moved to within a certain distance of the destination while traveling to the destination;
receiving a challenge, at the second mobile device, and in response, sending security information and an associated GPS coordinate from the second mobile device to the sender of the challenge, wherein the sender of the challenge verifies that the second mobile device has successfully reached the destination; and
wherein the security information comprises one or more of a digital signature computed and sent, a passcode entered by a corresponding user, coupon information, and a membership identification.

15. The method of communicating according to claim 14 wherein the at least one notification takes the form of one or more of a textual message, an audio message, and/or a graphic image, and wherein providing the at least one notification comprises one or more of:
offering a first notification when the second mobile device is within a preset distance from the destination;
transferring a second notification after reaching the destination; and/or
conveying a third notification periodically while navigating towards the destination.

16. The method of communicating according to claim 14 wherein accepting further comprises:
displaying the request to a user and prompting the user to accept the request;
authenticating selectively the first mobile device or a user of the first mobile device; and
noting the user acceptance of the request and continuing with the storing of the navigational coordinates.

17. The method of communicating according to claim 14 wherein providing the at least one notification comprises:
periodically determining how far the second mobile device is from the first mobile device;
conveying a first message to the first mobile device when the second mobile device is within a default distance or a default time away from the first mobile device; and
transferring a second message when the second mobile device has arrived at a location where the first mobile device is also currently located.

18. The method of communicating according to claim 14 wherein:

the navigational coordinates, the request, and a reference to the second mobile device are delivered to a server by the first mobile device, the server communicatively coupled to both the first and second mobile devices;

wherein the navigational coordinates and the request are conveyed to the second mobile device by the server;

wherein the navigational coordinates are based on at least one of a latitude, longitude, and height system, earth centered Cartesian coordinates, earth centered earth fixed, earth centered inertial, and east north up; and wherein the reference is one of an IP address, a phone number, an account information and a user name.

19. The method of claim 14, comprising:

receiving, at the second mobile device from the first mobile device, a response to the notification.

20. The mobile device of claim 1 wherein the at least one notification comprises a message or graphic selected from a plurality of pre-defined messages or graphics according to a distance between the mobile device and the second mobile device.

* * * * *

UNITED STATES PATENT AND TRADEMARK OFFICE
CERTIFICATE OF CORRECTION

PATENT NO. : 8,588,814 B2  
APPLICATION NO. : 12/012859  
DATED : November 19, 2013  
INVENTOR(S) : Jayanthi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this  
First Day of September, 2015

Michelle K. Lee  
*Director of the United States Patent and Trademark Office*